US007032753B2

(12) United States Patent
Purvis

(10) Patent No.: US 7,032,753 B2
(45) **Date of Patent: *Apr. 25, 2006**

(54) REPLACEABLE COOLER TOPS WITH SPORT LOGO

(76) Inventor: Mary Purvis, 1606 Forest Heights, Fayetteville, AR (US) 72703

( * ) Notice: Subject to any disclaimer, the term of this patent is extended or adjusted under 35 U.S.C. 154(b) by 330 days.

This patent is subject to a terminal disclaimer.

(21) Appl. No.: 09/893,770

(22) Filed: Jun. 29, 2001

(65) Prior Publication Data

US 2001/0035366 A1 Nov. 1, 2001

Related U.S. Application Data

(63) Continuation of application No. 09/437,667, filed on Nov. 10, 1999.

(51) Int. Cl.
*B65D 73/00* (2006.01)

(52) U.S. Cl. .................................... 206/459.5; 206/545

(58) Field of Classification Search ................ 206/575, 206/457, 459.5; 40/312; D7/605, 606
See application file for complete search history.

(56) References Cited

U.S. PATENT DOCUMENTS 2,584,254 A * 2/1952 Brodbeck .................... 40/312
2,919,829 A * 1/1960 Forrer ..................... 206/459.5
4,274,267 A 6/1981 James et al.
4,449,761 A 5/1984 Davis et al.
D325,493 S * 4/1992 Hicks et al. ................. D7/605
D369,524 S * 5/1996 Gunter, II et al. ........... D7/606
D369,946 S * 5/1996 Miller et al. ................. D7/606
D378,562 S * 3/1997 Miller et al. ................. D7/606
5,803,266 A * 9/1998 Blackwelder ............... 206/575

FOREIGN PATENT DOCUMENTS

DE 200 16 681 4/2001

OTHER PUBLICATIONS

Conventional Coleman "Little Oscar" cooler devices with multi-colored lids, dating from the mid 1980's at the latest.*

* cited by examiner

*Primary Examiner*—John G. Weiss
*Assistant Examiner*—Michael J Fisher
(74) *Attorney, Agent, or Firm*—Rader, Fishman & Grauer PLLLC

(57) ABSTRACT

Interchangeable portions of a cooler or container, having a sports logo thereon, allows a single cooler body or container body to have a first logo at one particular time, and a second logo at another time, upon replacement of interchangeable the portions. Preferably, the portions comprise a plurality of cooler tops, each having a different sports logo, each mating directly or through interchangeable hinge portions with the same cooler body, or being secured to a planar portion of the cooler or container. Alternatives for securing the attachment to the cooler planar portion are disclosed and include adhesive, VELCRO brand fasteners, guide members, or elastomeric attaching members.

18 Claims, 9 Drawing Sheets

REPLACEABLE COOLER TOPS WITH SPORT LOGO

The Applicant is a continuation of the prior filed, but copending U.S. application Ser. No. 09/437,667 filed Nov. 10, 1999.

BACKGROUND OF THE INVENTION

1. Field of the Invention

This invention generally relates to coolers, such as insulated, portable, molded coolers with insulated walls, bottom and top, or to insulated containers having a removable top. More particularly, this invention relates to a readily attachable and detachable top for such coolers or containers to permit easy replacement of a top with another having a sports logo for a team of choice. Still more particularly, this invention relates to a readily removable and attachable attachment for a cooler top or side to display a team or sports logo of choice.

2. Description of the Related Art

Sports teams of most sports have a team logo or name by which they are identified, often fanatically, by fans of the sport or the team. Thus, it is well known to identify with the college entertainment services provided by the University of Arkansas "RAZORBACKS" or the University of Florida "GATORS" football teams, and with professional football entertainment services provided by the Dallas "COWBOYS" and Tennessee "TITANS" football teams, by way of example. Moreover, some sports fans may schedule a local college football game to attend on a Saturday afternoon, and a professional football game at another accessible location on a Sunday afternoon, again by way of example. Cross attendance of one sport, such as football, with another, such as baseball, is also popular and possible.

Use of and licensing of team logos for fan identification is an immensely large business in the United States and worldwide. The name and logo of a particular team may appear on such items as jackets, jerseys, tee-shirts, socks and virtually every item of clothing, school pamphlets and booklets, and on other items of interest to the avid sports fan. Such items are very suitable for personal purchase or for birthday, anniversary and holiday-gift giving as a result of excellent multi-media marketing by leagues and individual teams. Posters and labels, with a suitable adhesive such as a permanent glue, are often used to be attached to another item to show allegiance to or support for a team of interest. License plates and license plate holders, in addition to decals, often display a team of popularity and interest.

On the other hand, insulated devices such containers or coolers are popular for sports fans. Containers or coolers for food and beverages can assume a wide variety of forms. One popular container design is a generally cylindrical type of fluid-tight container, having a removable top which is rotatably secured or removed from the container. One particularly popular cooler design is an insulated chest-shaped cooler with an insulated top, an insulated bottom, and pairs of opposed of insulated sides, in which the top may or may not be permanently attached to the bottom/sides arrangement. Such cooler chests may or may not have handles, either external or recessed, for transporting the coolers from one location to another. Another type of popular insulated container is a vacuum or THERMOS brand bottle having a vacuum, insulated portion and a top, such as a rotatable screw-on cap.

Sports fans bringing such containers or coolers to sports events of interest have insisted upon having an identification with their teams of choice. A simple but convenient way of showing team support or allegiance is by a decal attached to the container or cooler. Such decals, whether permanently a part of the food or beverage container or cooler, are in the form of planar labels, but are rarely easily removable. Thus, it is difficult, without attaching several planar decals or labels to the top or sides of the cooler chest or other container, to show multiple team allegiance with a single multi-use container or cooler.

Sports cooler tops may also have a three dimensional character, as representatively shown in Design Patents Nos. U.S. Pat. No. Des. 369,524, showing a baseball hat cooler; U.S. Pat. No. Des. U.S. 369,946, showing a football helmet cooler, and U.S. Pat. No. Des. 378,562, showing a top having a portion of a baseball, or a football, or a golf ball, thus to identify the cooler with a sport of interest. All three of these design patents show a sports-related item with three-dimensional characteristics on the top of the cooler, while U.S. Pat. No. Des. 386,649 shows a non-sports example of an upraised cooler top design. On the other hand, U.S. Pat. No. Des. 349,630 shows an ornamental design for a styrofoam ice chest where the sides of the cooler are together formed in the shape of a football helmet.

Heretofore, modifications to the planar top, or to the sides, for identification or allegiance to multiple sports or teams has not been considered for a single container or cooler, whether made from styrofoam or according to the more traditional insulated cooler. Thus, it is an aim of the invention to provide a number of alternative solutions to present a single cooler or container with a set of two or more readily exchangeable tops or sides, each representing a different team of interest, whether local, collegiate, or professional and differing sports, such as basketball or baseball or football.

SUMMARY OF THE INVENTION

This invention generally relates to a method and apparatus for achieving the aims of the invention.

It is an overall feature of this invention to provide a set comprising at least two interchangeable portions of a cooler or container, such as alternative tops for the same cooler body or container body, each interchangeable portion having a different logo, so that the same cooler body or container body can have a first logo at one particular time, and a second logo at another time, upon replacement of that interchangeable portion of the cooler or container with one or another of the set. In a first aspect of this invention, interchangeable cooler tops are provided for a cooler body, while in a second aspect of the invention, mechanically interchangeable cooler tops are provided with a cooler body which permits easy and convenient exhangeable interchange of one cooler top with another from the set. Similarly, the alternative tops for the containers are drawn from a set of at least two interchangeable container tops having differing team logos. A typical example of the second aspect of the invention uses mortise and tenon arrangement at the hinge which has a fixed portion secured to the cooler. This latter embodiment thus changes the tops at the hinge for a secure connection to the cooler.

It is another feature of this invention to provide an attachment for an existing cooler or container to modify a planar top of the cooler or container. According to this feature of the invention, an attachment, having means for securing the attachment to the top of a cooler or container, is provided with a particular logo. The attachment is readily attachable or detachable from the cooler or container, so that the user, wanting to convert the cooler from logo A for team A or sport A to logo B for team B or sport B merely removes the first attachment and replaces it with a second attachment. A set of at least two attachments with a plurality of logos are envisioned to be readily available to the consumer/sports fan and conversion is contemplated as convenient and easy.

In another aspect of the invention, the attachment is readily attachable or detachable from the cooler or container by loop and hook fasteners, such as “VELCRO” brand fasteners. In an alternative, the attachment may be by adhesive having sufficient strength to adhere the attachment to the cooler or container, but having insuffiicent strength to prevent its ready removal without defacing either the cooler top, or the attachment itself. According to this aspect of the invention, the attachment is preferably readily attachable and removable from the cooler top, but also may be readily attachable and removable from a side or an end of the cooler body.

In yet another aspect of the invention, the attachment is in the form of a thin molded, pressed, or cast member that is positioned in a guide on a top or side of the cooler. The thin molded or cast member is sufficiently flexible to be inserted in the guide on the cooler or container, or the guide may have set screws or other suitable means for removably securing and fastening the attachment to the cooler or container.

In still another embodiment of the invention, each alternative cooler top is provided with either an integral or a separable belt-like elastomeric downwardly extending member for enveloping an upper portion of the cooler itself, thus to secure the cooler top with the cooler body.

In yet a further aspect of the invention, an attachment device for insulating cooler devices comprises a structural member, and at least one affixation device. The structural member has predetermined indicia thereon, and the affixation devices are supportable on a portion of the structural member. The structural member and the affixation devices are so dimensioned as to releasably affix the structural member to a substantially planar portion of the insulating cooler device.

In still an additional aspect of the invention, a method of attaching predetermined indicia to an insulating cooler device is disclosed. The method comprises the steps of providing a structural member having the predetermined indicia thereon, applying a releasable affixation device to the structural member, and releasably affixing the structural member to a planar portion of the insulating cooler device using the releasable affixation device.

In yet an additional aspect of the invention, method of interchanging attachments, having predetermined indicia thereon, for an insulating cooler device is disclosed. The method comprising the steps of a) providing an insulating cooler device having a substantially planar portion, b) providing a plurality of interchangeable structural members, each interchangeable structural member having the predetermined indicia thereon, c) releasably affixing one of the plurality of interchangeable attachments to the substantially planar portion using the releasable affixation device for a first predetermined time period, d) removing the one interchangeable attachment from the substantially planar portion, and e) releasably affixing an other of the plurality of interchangeable attachments to the substantially planar portion for a second predetermined time period.

These and other objects and features of the invention will become more apparent from a review of the written description of the invention that follows, taken with the accompanying drawings.

BRIEF DESCRIPTION OF THE DRAWINGS

FIG. 1, having

FIG. 1D shows an abbreviated view of a representative cooler top of FIG. 1A or 1B being mechanically interchanged with the cooler of FIG. 1C in an alternative embodiment.

FIG. 2, having

FIG. 5, having

FIG. 6, having

FIG. 7, having

DESCRIPTION OF THE PREFERRED EMBODIMENTS

Throughout this specification, the words “sports logo” imply and mean a three-dimensional logo, such as of an Arkansas RAZORBACK, a Florida GATOR, or the like, but is not restricted to football. Rather, the logo can be for any sport and show any team allegiance or support, regardless of level of competition. Thus, the invention is useful for high school, college and professional sports logos for all types of sports. Where the context requires, the use of the terms “sports decal” imply and mean a two-dimensional logo such as a decal or pennant type logo. Similarly, the term “cooler” implies and means an insulated cooler having an attached or unattached generally planar insulated top for mating with a four-sided and bottomed box-like insulated container, with integral or external handles, useful for toting beverages or food to sporting events and to pre-event or post-event activities, such as the so-called “tailgate” parties. By way of further definitions, a first logo referring to a particular team or sport is herein generally referred to as “logo A” while a second logo referring to another team or sport is herein generally referred to as “logo B” so as not to limit the scope of the invention. It should also be understood that the logos are not limited to sports teams and organizations, but could include any indicia for which support may be expressed. By way of non-limiting examples, company names, or Government agency names, could also be used.

Figures 1A, 1B, 1C:
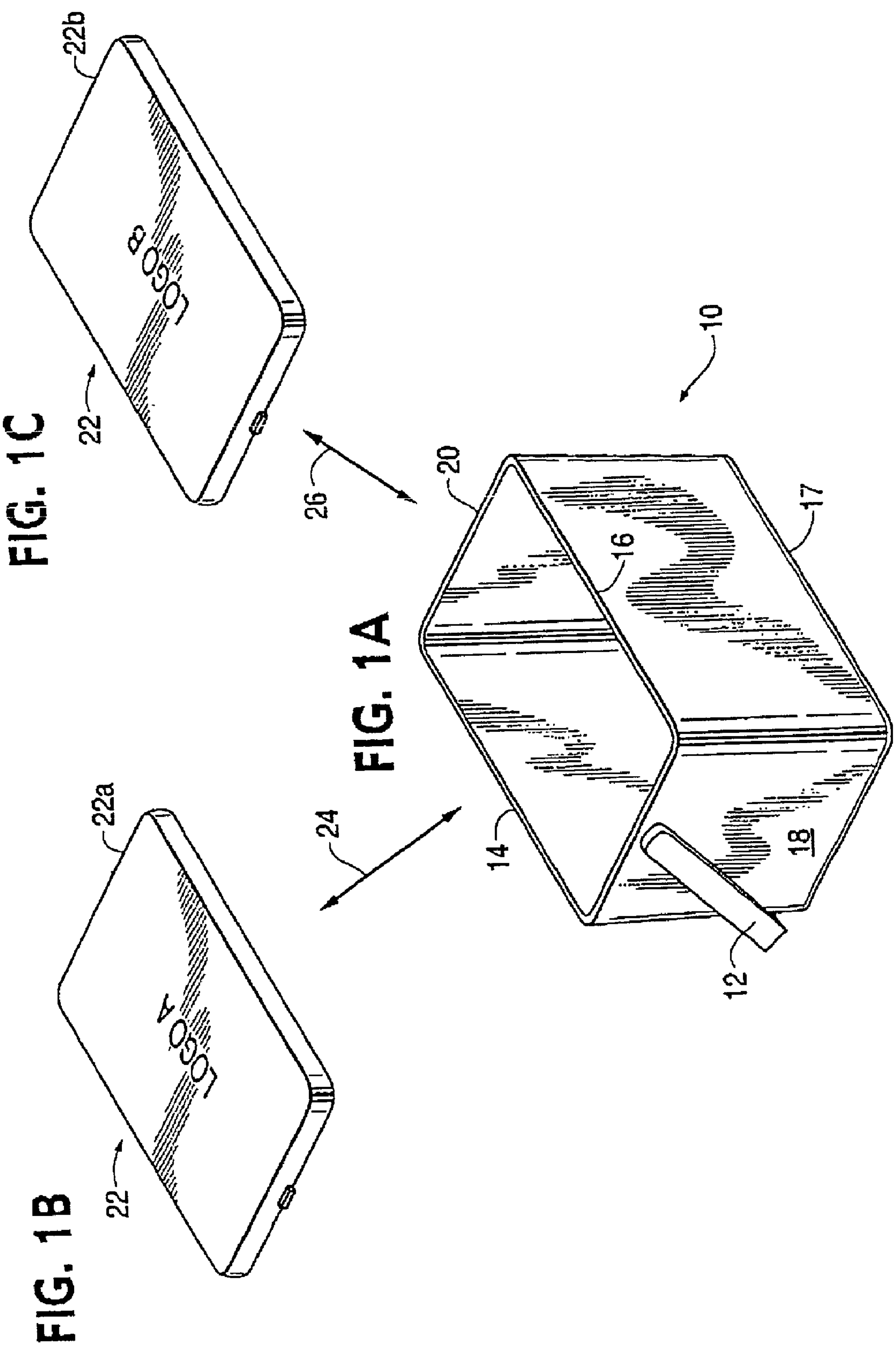
FIGS. 1A, 1B, 1C and 1D, illustrates a set of at least two alternative replaceable cooler tops in FIG. 1B or 1C for attachment to or securing to the top of the cooler shown in FIG. 1A by manual interchange of the respective tops.

In FIG. 1, a cooler 10 of the type generally described is shown in FIG. 1A having a handle 12, opposed insulated side walls 14, 16, opposed insulated end walls 18, 20 and an insulated bottom 17 interconnecting the opposed side walls 14, 16 with the end walls 18, 20 into a unitary structure. Together, the members form an open-topped insulated box-like structure recognized as a cooler for receiving a cooler top 22 in a mating relationship. FIG. 1B thus shows a cooler top 22*a* having "logo A" while FIG. 1C shows a cooler top 22*b* having "logo B", each sized and shaped to mate snugly in a mating, insulating relationship at the upper portion of the cooler 10 shown in FIG. 1A. According to the invention, a set of interchangeable tops 22*a*, 22*b*, . . . 22*n* are available, each having individual logos, i.e. logo A, logo B, . . . logo N. In an alternative, a particular top of a set may itself have more than one logo and be custom-made according to the whims and preferences of the user.

According to the invention, a set comprising at least two, and preferably more, cooler tops 22*a*, 22*b* are prepared with selected logos. Assuming that the top 22*a* is in place at the top of the cooler 10 showing logo A, the user is free to take the cooler to a game of choice while showing the logo A. Then, the consumer, desiring to have a top 22*b* having a different logo B in place of logo A on top 22*a* merely removes top 22*a* as shown diagrammatically by arrow 24 and replaces it with top 22*b* as shown diagrammatically by arrow 26. The described exchange may selectively be repeated with any of the set of tops.

Figure 1D:
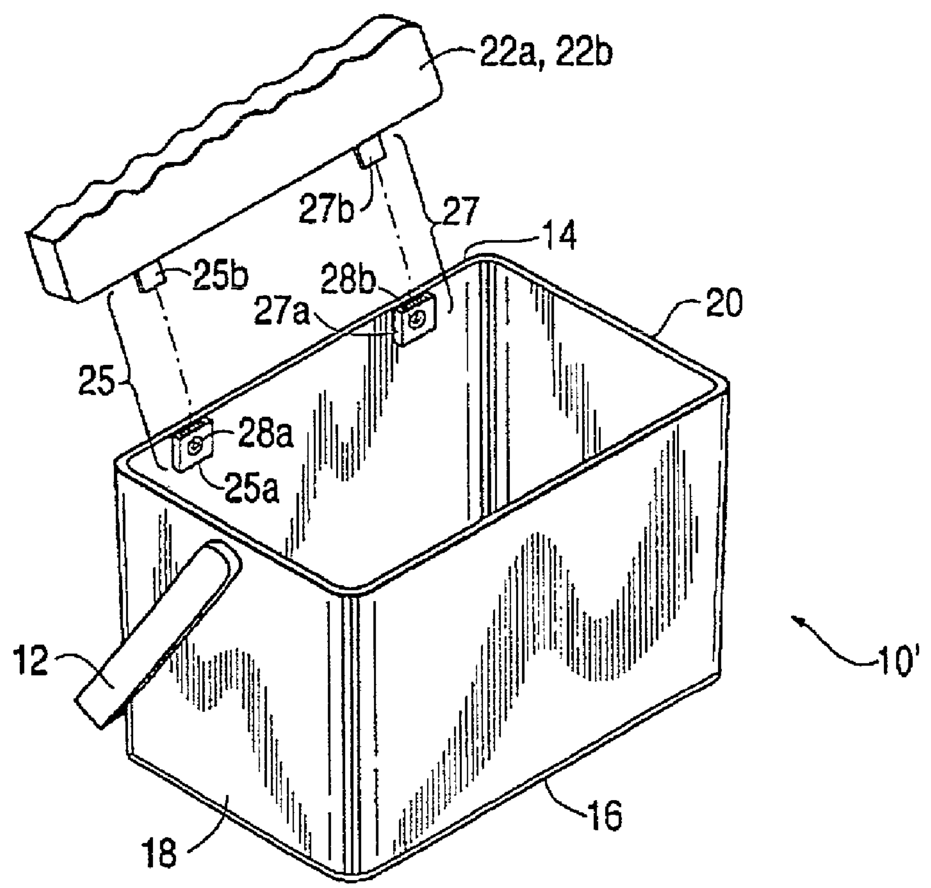

While the particular cooler shown in FIG. 1A is an open-topped cooler 10, such as one which could be made from styrofoam or molded plastic spaced walls with insulating material intermediate the walls forming the sides, top and bottom, the invention is applicable to coolers 10A having hinged, pivotable tops 22*a*', 22*b*' secured to the cooler 10' by hinges 25, 27. In that case, a quick connect arrangement is necessary to fix and release a cooler top in a manner convenient to the user to permit the exchange of tops as described in connection with FIG. 1. For example, the connection could be made with set screws 28*a*, 28*b* through a portion of the hinge member 25*a*, 27*b* for securing the top 22*a*, 22*b* by a hinged flange 25*b*, 27*b*, as representatively shown in FIG. 1D. The notion of the invention shown in FIG. 1 is to provide a plurality of lids or tops of coolers, regardless of physical connection, to be alternatively used with the same cooler base 10, each bearing a different sports logo. Thus, while a generally box-like structure is depicted, the ordinarily skilled artisan will appreciate that various shaped devices and mating covers could be used.

According to the method of using the invention as shown in FIG. 1, a user fond of the Arkansas RAZORBACKS collegiate football team and the Tennessee TITANS professional football team could choose to attend the sporting event in Fayetteville, Ark. with logo A on a first top for the cooler on a Saturday, for example. Then on a Sunday, for example, the patron could attend a Tennessee TITANS professional football team in Memphis, Tenn. after substituting the top 22*b* with logo B for the cooler top 22*a*. Thus, according to the method of using the invention, a cooler 10 having a top 22*a* is provided with a first logo 22*a* for a first period of time. A top 22*b* having a logo B is conveniently substituted for the top 22*a* having a logo B, as indicated by the dual-pointed arrows 24, 26 indicating the interchangeability of the cooler tops.

FIG. 1D shows a portion of the cooler top at about its hinge portion, providing a mortise and tenon type of metallic attachment. Thus, the top 22*a* could have a pair of hinged tenons 25*b*, 27*b* at spaced locations in register with a pair of fixed mortises 25*a*, 27*a* on the cooler 10, each having a set screw 28*a*, 28*b* for securing the tenons 30 respectively therein. By unscrewing the set screws 28*a*, 28*b*, the tenons 25*b*, 27*b* for the top 22*a* are released and the tenons 25*b*, 27*b* for the top 22*b* are inserted. Then, the set screws 28*a*, 28*b*, preferably permanently attached, are tightened so that the top 22*b* is exchanged for the top 22*a*. Alternative, the mortises could be hinged at the bottom of the cooler and the tenons fixed therein as described. The result is a removable, exchangeable, hingedly connected structure permitting easy exchange between alternative tops. Other types of replaceability are also contemplated. For example, the mortise and tenon arrangement could be merely spring-biased with a depressed clip for releasing spring tension laterally holding the tenon in the mortise securely. Such an arrangement is similar to a spring-biased luggage snap, for example.

Of course, a plurality of tops 22*a* . . . 22*n* as previously described, but greater in number than two, could also be provided, each having a useful and convenient logo, for use one-at-a-time on the cooler 10.

Figures 2A, 2B:
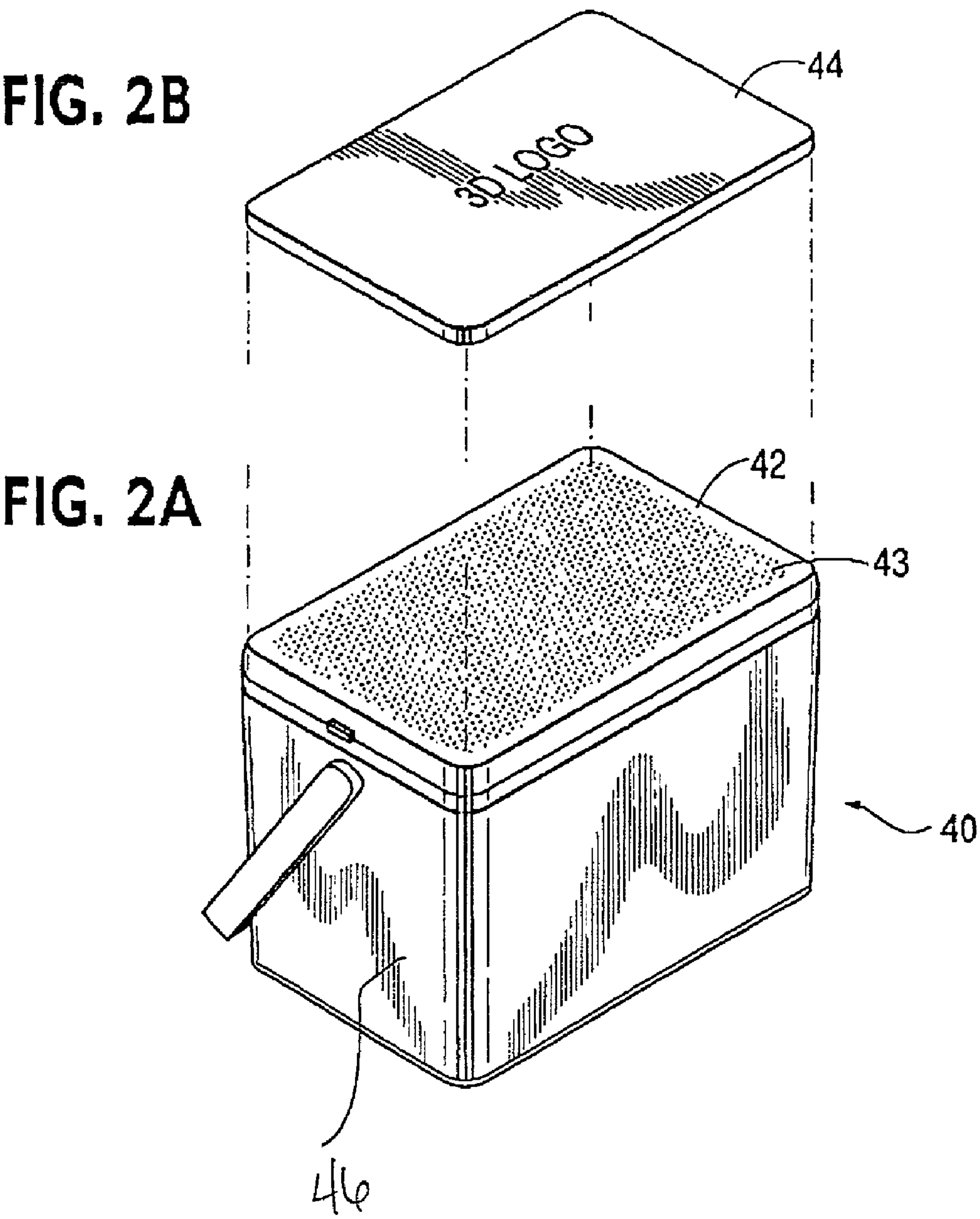
FIGS. 2A and 2B, shows an attachable top portion in FIG. 2A for being adhesively secured to the cooler in FIG. 2B, such as by a suitable adhesive.

FIG. 2 shows a second feature or embodiment of the invention. A cooler 40, of a conventional type, as shown in FIG. 2A, but similar to the cooler shown in FIG. 1A, is provided with a relatively planar top 42, to which is removably secured a relatively thin attachment 44 bearing a logo of interest. Reference numerals generally describing the cooler, as in FIG. 1, are eliminated to simplify the explanation. The attachment 44 is made by casting, or forming, or molding to depict a three-dimensional sports logo of the type discussed above. In its broadest aspects, the attachment 44 is removably secured to the top 42 of the cooler 40 by an adhesive or other securing means that permits selective removal when it is desired to change the sports logo on the cooler as described in connection with FIG. 1. The thickness of the attachment 44 is not of major concern, but its periphery should be not greater than the periphery of the underlying top 42 that serves as its substrate. Whenever desired, a first sports logo on an attachment 44 can readily be removed and a new attachment, having a different or second sports logo can be replaced thereon. A type of adhesive contemplated for use with the invention is one suitable for its intended purpose to hold the attachment on the top when used, but permitting the attachment 44 to be removed from the top 42, when desired for replacement. In this respect, therefore, adherance of the type exhibited by a well-known "POST-IT" note is a suitable example of the type of adhesive contemplated.

Figure 3:
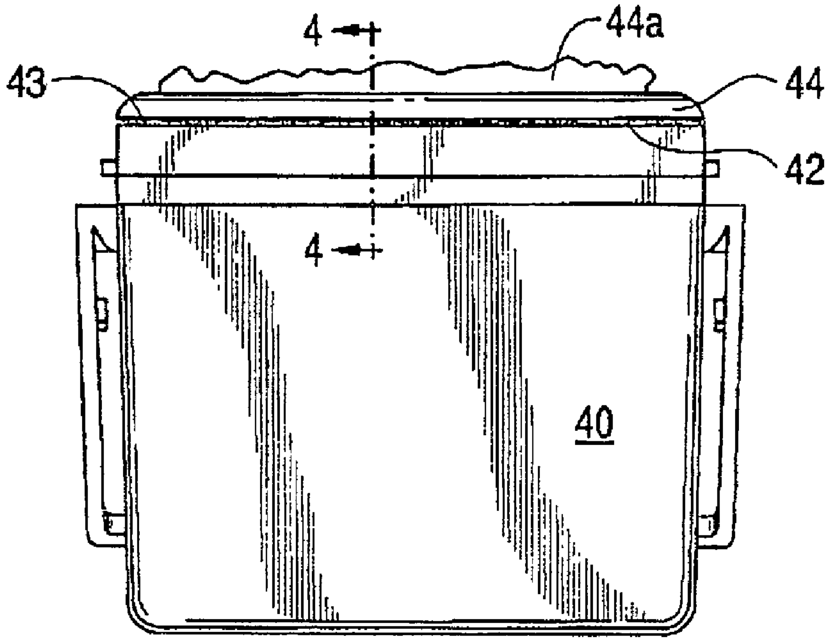
FIG. 3 shows a side view of the embodiment of FIG. 2 in which the adhesively-secured attachment is nearly integral in shape with the cooler top.

FIG. 3 shows a side view of the cooler with an attachment 44 secured to its top 42, and further showing the parting line or adhesive line 43 for mating the attachment 44 to the cooler top 42. The adhesive selected is one which is suitable for its intended purpose of holding the attachment securely in place until it is desired to change the attachment, as described. It may also be noted that in FIG. 3, a three-dimensional logo appears in cross section, as shown by reference numeral 44*a*.

Figure 4:
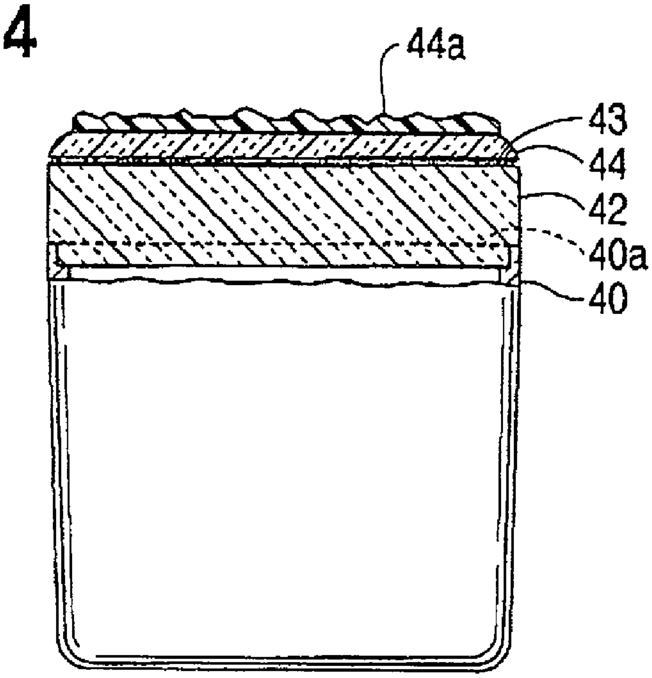
FIG. 4 shows a partial side cross-sectional view taken along lines 4—4 of FIG. 3.

FIG. 4 shows a side cross sectional view in elevation taken along line 4—4 of FIG. 3. It can be seen that by adhesively securing the attachment 44 to the top 42 of the cooler 40, the overall contours of the cooler are virtually unchanged. The reference numeral 40*a* shows a shoulder within the cooler 40 on which the top 42 rests in normal circumstances.

An alternate to the embodiment to FIGS. 3 to 4 is now described. That is, the attachment 44 is selectively and removably secured to a relatively planar side 46 of the cooler 40. In its preferred embodiment, the attachment 44 is selectively adhered to a tope surface 42, but alternatively, an attachment could be secured to a side surface 46 as described above. In an acceptable alternative, a plurality of similar attachments 44, bearing either the same of different logos, are secured as described above to any of the top, sides, or ends of the cooler. In this way, a single cooler could display up to five (5) sports logos on its surfaces, excepting the bottom surface to avoid inadvertent wearing of the logo and instability of the cooler form the three-dimensional lower surface or bottom. While the adhesive preferred is as previously described, this multi-surfaced embodiment can also be accomplished by using the "VELCRO" brand hook and loop fasteners discussed later in connection with FIG. 5.

Figures 5A, 5B:
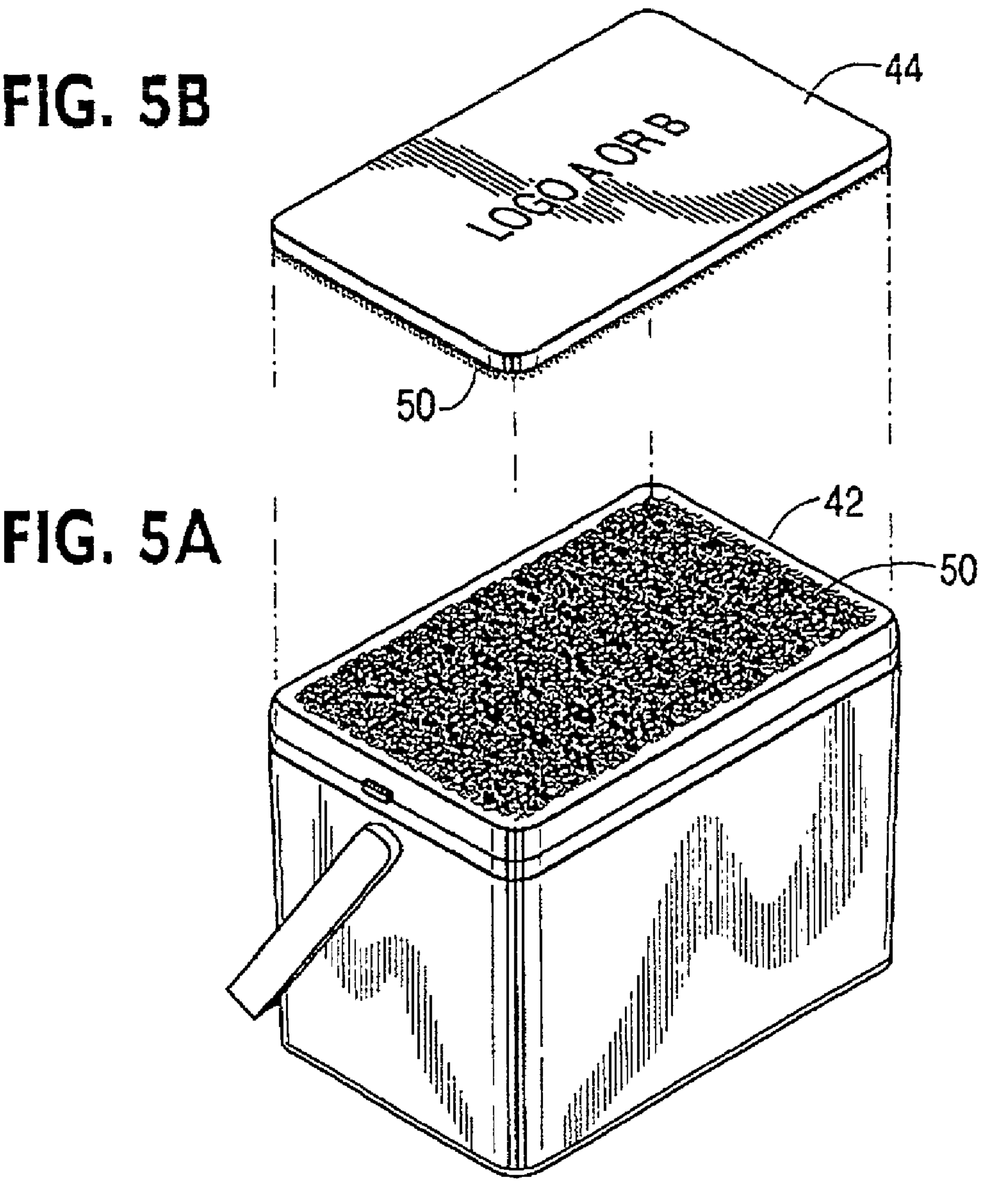
FIGS. 5A and 5B, shows an exemplar manner of securing the attachment of FIG. 2A by “VELCRO” brand hook and loop fastener to the cooler body.

FIG. 5, having FIGS. 5A and 5B, shows a representative embodiment in which a cooler top attachment 44 and top 42 are secured together, but releasably, by "VELCRO" brand hook and loop type securing members 50. Which half of the securing members is on top and which is on the attachment is not significant. In use, by bringing the attachment in proximity to the top, the fasteners mater to securely hold the attachment on to the top of the cooler. Later, to exchange a top 42 for another, the user merely pulls on an edge or corner of the attachment in a well-known manner, to release the current attachment from the top of the cooler, leaving the top ready to receive another attachment with a like fastener on its reverse surface.

Figure 6B:
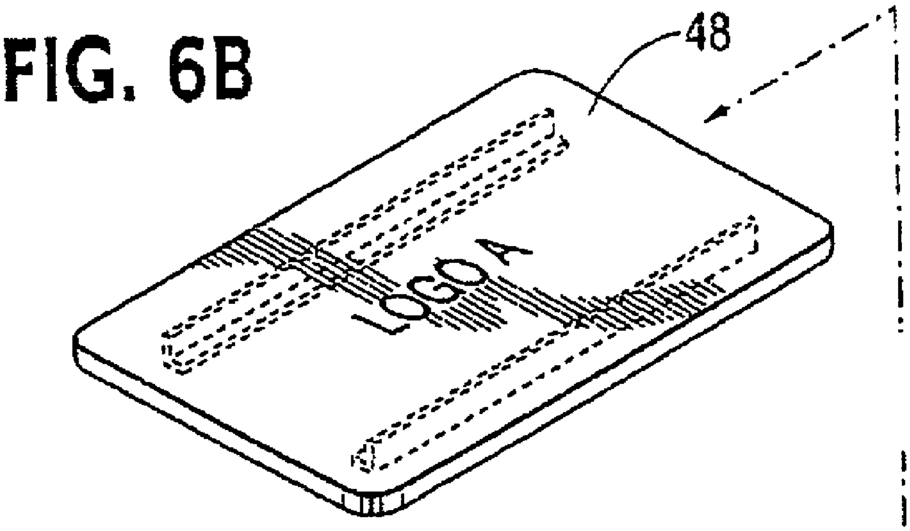
FIGS. 6A and 6B shows another exemplary manner of securing the attachment of FIG. 2A to the cooler top by a mechanical guide arrangement on a top or a side of the cooler bottom, wherein the attachment is merely held in and guided by the mechanical guide arrangement.
Figure 6A:
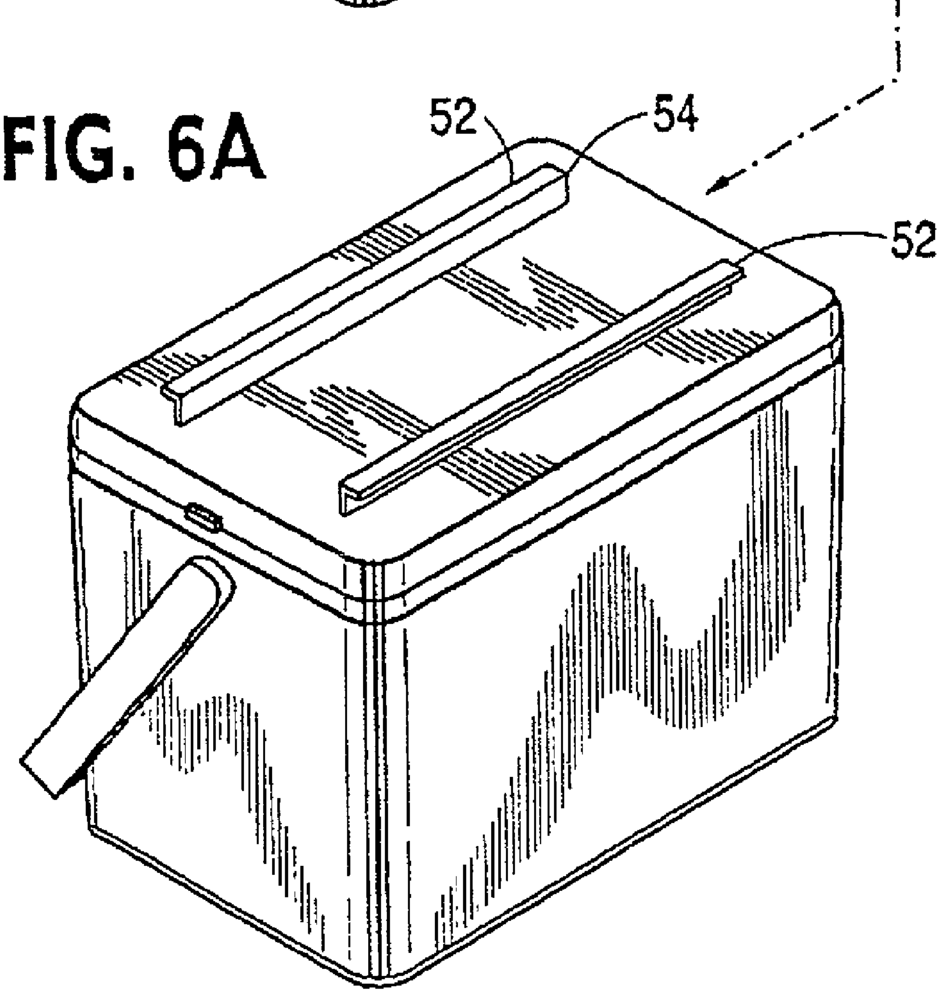

FIG. 6, having FIGS. 6A and 6B, shows a representative embodiment in which a sports logo attachment 48 is retained within at least a pair of guide members 52, and as many as four of such guide members arranged quadrilaterally. Each guide member may have an L-shaped cross section with a vertical leg 54 and a horizontally-extending lip 54 which turns in toward the lip of the adjacent guide member. The attachment can be held within the guide members because of an overlap of the lips of the guide members relative the edges of the attachment. In this situation, the attachment can be sufficiently rigid so as not to require any adhesive. By appropriately locating at least a pair of the guide members 52 on the top of the cooler as shown, or on a side, or a combination of the top and sides, plural attachments can be provided for the cooler. The ordinarily skilled artisan will, of course, appreciate that the described shape and arrangement of the guide members is only exemplary, and that other shapes and arrangements could be used.

Figure 7B:
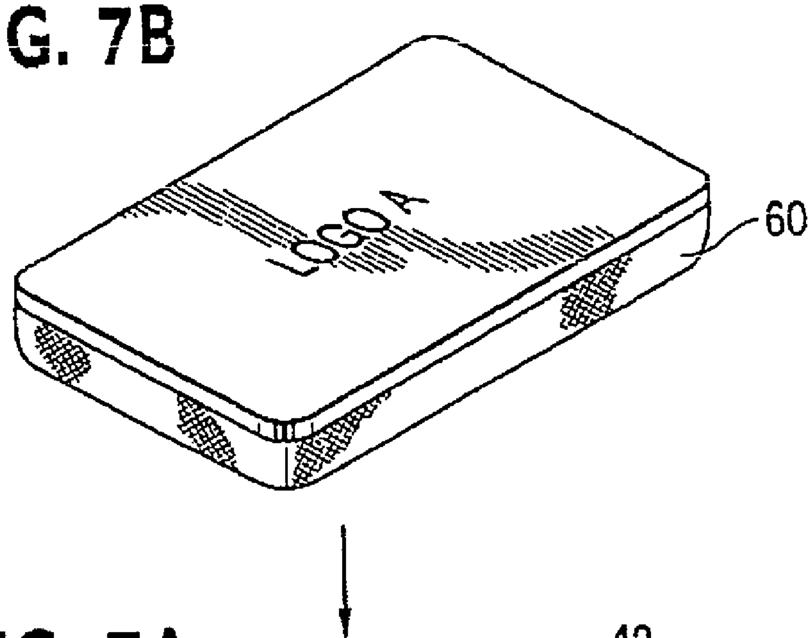
FIGS. 7A and 7B, shows an alternative embodiment for securing the attachment of FIG. 2A to either of the top or of any side of cooler by a plurality of guide members with integral downwardly extending elastomeric members.
Figure 7A:
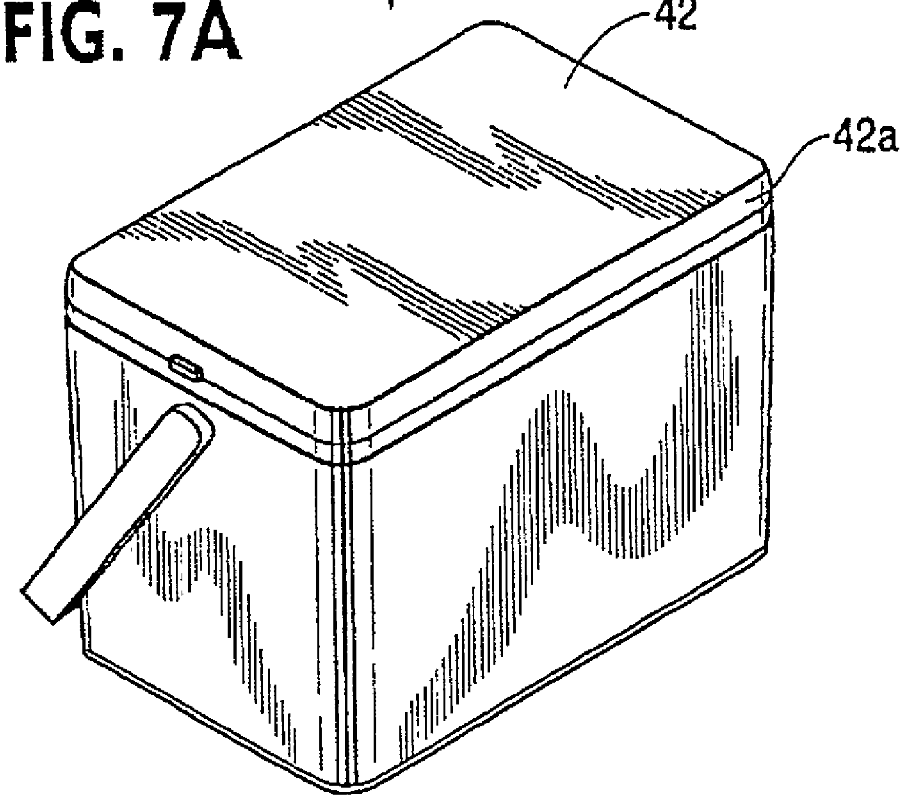

FIG. 7 shows another representative example of the securing means in which an elastomeric depending band member 60 is attached to and is integral with the attachment 44. The elastomeric band 60 is sufficiently elastic to permit the attachment to be secured to the top 42 of the cooler by extending the elastomeric band about a top portion 42*a* of the cooler top 42. Upon releasing of the elastomeric band member 60, the attachment is secured by the elastomeric band member 60 which has returned to its original shape and size. Preferably, the cooler top 42 has less rounded edges with planar vertical surfaces to present a larger generally vertical surface to accommodate more securely the elastomeric band member of the attachment 44, as shown representatively in FIG. 7A.

Figure 8:
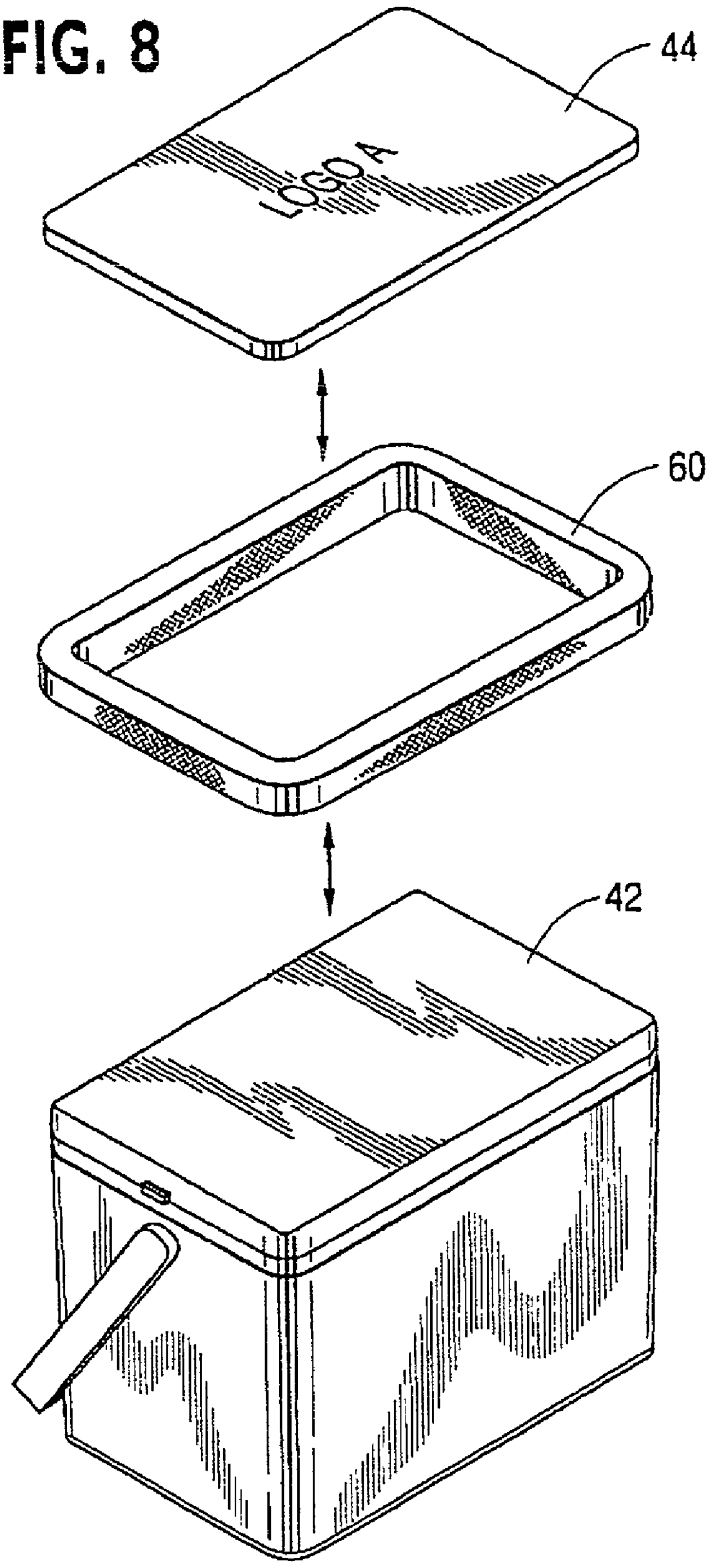
FIG. 8 shows yet another alternative embodiment for securing the attachment of FIG. 2A preferably to the top of the cooler by use a separate generally vertically-extending elastomeric member for securing the attachment to the cooler.

In an alternative, similar in concept to FIG. 7, FIG. 8 shows an elastomeric band member 60 which is separate from the attachment 44 or the cooler top 42. The elastomeric band for this embodiment can be circumferentially continuous or separated with a means for securing one opposed end to another. Otherwise, after placing the elastomeric band about the circumference of the attachment and the top, it returns to its original circumference to hold the attachment to the top. For the alternative discontinuous band embodiment, the band is placed about the circumference and one end connected to the other by a suitable securing means, such as a notch, a member, or the like.

Figure 9:
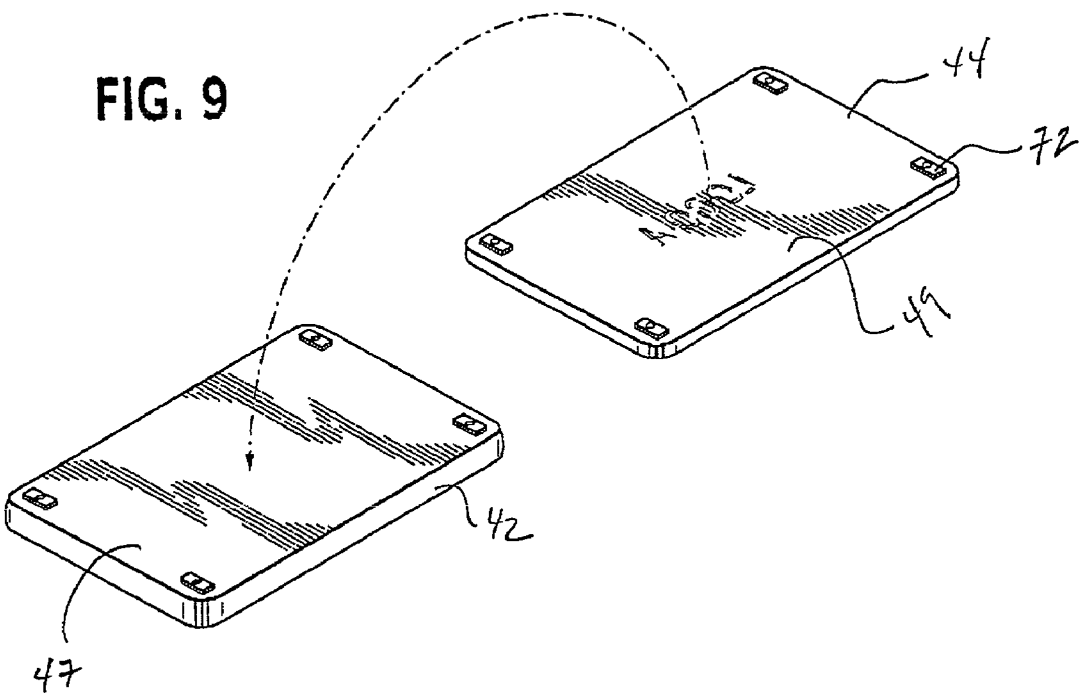
FIG. 9 shows a further alternative embodiment for securing the attachment of FIG. 2A preferably to the top of the cooler by use of magnetic type devices.

A further embodiment, depicted in FIG. 9, shows the use of magnetic type devices 72 for releasably securing the attachment 44 to the cooler top 42. The magnetic devices are arranged on the top surface 47 of the cooler top 42 and, in corresponding locations, on the bottom surface 49 of the attachment 44. This arrangement allows the attachment 44 to be releasably secured to the cooler top 42 via the magnetic force of attraction between corresponding magnetic devices 72. Of course, as will be clear to the ordinarily skilled artisan, not all of the magnetic devices need be magnets. For example, the magnetic devices 72 on the top surface 47 of cooler top 42 could be magnets, while the devices 72 on the bottom surface 49 of attachment 44 could be any type of ferromagnetic material, or visa-versa.

The embodiment of FIGS. 2 to 9 thus show various means for selectively adhesively securing to the cooler, whether at its top or at its sides and ends, including adhesives, "VELCRO" brand hook and loop fasteners, guide rails, elastomeric band members, or magnetic force. Other mechanical means for achieving the desired coaction and cooperation between the attachment and its cooler top are also available for use.

What is claimed is:

1. A method of releasably attaching predetermined indicia to an insulating cooler device having an insulating cooler and at least a pair of interchangeable structural members for said cooler, comprising the steps of:

providing a structural member sized and dimensioned in a manner that is structurally compatible with a body of an insulating cooler and having the predetermined indicia thereon;

applying a releasable affixation device to said structural member; and releasably affixing said structural member to a planar portion of said insulating cooler using said releasable affixation device, whereupon said affixing step includes a step of non-destructively exchanging one structural member having a second predetermined indicia on said body.

2. A method of attaching predetermined indicia to an insulating cooler device according to claim 1, wherein said applying step comprises the step of applying adhesive to the said structural member.

3. A method of attaching predetermined indicia to an insulating cooler device according to claim 1, wherein said applying step comprises the step of applying a hook and loop type of fastener.

4. A method of attaching predetermined indicia to an insulating cooler device according to claim 1, wherein said applying step comprises the step of applying a plurality of guide members.

5. A method of attaching predetermined indicia to an insulating cooler device according to claim 1, wherein said applying step comprises the step of applying an elastomeric band, so dimensioned as to extend around a periphery of said structural member.

6. A method of attaching predetermined indicia to an insulating cooler device according to claim 1, wherein said applying step comprises the step of applying magnets or ferromagnetic metal structurally arranged so as to mate with magnets or ferromagnetic metal attached to said insulating cooler device.

7. A method of attaching predetermined indicia to an insulating cooler device according to claim 1, wherein said predetermined indicia is a sports logo.

8. A method of interchanging attachments for an insulating cooler device, said attachments having predetermined indicia thereon, said method comprising the steps of:

a) providing an insulating cooler device having a substantially planar portion;

b) providing a plurality of interchangeable structural members, each said interchangeable structural member having the predetermined indicia thereon;

c) releasably affixing one of said plurality of interchangeable attachments to said substantially planar portion using said releasable affixation device for a first predetermined time period;

d) removing said one interchangeable attachment from said substantially planar portion; and e) releasably affixing another of said plurality of interchangeable attachments to said substantially planar portion for a second predetermined time period.

9. A method of interchanging attachments for an insulating cooler device according to claim 8, further comprising the step of:

applying a releasable affixation device to each of said plurality of interchangeable attachments.

10. A method of interchanging attachments for an insulating cooler device according to claim 8, wherein said applying step comprises the step of applying adhesive to the said structural member.

11. A method of interchanging attachments for an insulating cooler device according to claim 9, wherein said applying step comprises the step of applying a VELCRO brand fastener.

12. A method of interchanging attachments for an insulating cooler device according to claim 9, wherein said applying step comprises the step of applying a plurality of guide members.

13. A method of interchanging attachments for an insulating cooler device according to claim 9, wherein said applying step comprises the step of applying an elastomeric band so dimensioned as to extend around a periphery of said interchangeable attachment members.

14. A method of interchanging attachments for an insulating cooler device according to claim 9, wherein said applying step comprises the step of applying magnets or ferromagnetic metal structurally arranged so as to mate with magnets or ferromagnetic metal attached to said insulating cooler device.

15. A method of interchanging attachments for an insulating cooler device according to claim 9, wherein said interchangeable attachment is a removable cover, and wherein said applying step comprises the step of integrally attaching a structural member to said removable cover that mates with a body portion of said insulating cooler device.

16. A method of interchanging attachments for an insulating cooler device according to claim 15, wherein said integrally attaching step comprises attaching a plurality of mortises or tenons, so dimensioned as to mate with corresponding tenons or mortises, respectively, on said insulating cooler device.

17. A method of interchanging attachments for an insulating cooler device according to claim 15, wherein said integrally attaching step comprises attaching an elastomeric band around a periphery of said removable cover.

18. A method of interchanging attachments for an insulating cooler device according to claim 8, wherein said predetermined indicia is a sports logo.

* * * * *

UNITED STATES PATENT AND TRADEMARK OFFICE

CERTIFICATE OF CORRECTION

PATENT NO. : 7,032,753 B2
APPLICATION NO. : 09/893770
DATED : April 25, 2006
INVENTOR(S) : Mary Purvis It is certified that error appears in the above-identified patent and that said Letters Patent is hereby corrected as shown below:

Column 8:
Line 43, "member having a second predetermined indica" should read -- member having a first predetermined indicia for another structural member having a second predetermined indicia --.

Signed and Sealed this

Twenty-fourth Day of October, 2006

JON W. DUDAS
*Director of the United States Patent and Trademark Office*